United States Patent
Meier et al.

(10) Patent No.: US 8,612,756 B1
(45) Date of Patent: Dec. 17, 2013

(54) METHODS AND DEVICES FOR ADJUSTING THE PRECISION OF LOCATION INFORMATION

(71) Applicant: Google, Inc., Mountain View, CA (US)

(72) Inventors: Reto Meier, Mountain View, CA (US); Jeff Brown, Mountain View, CA (US); Nicholas Julian Pelly, San Francisco, CA (US); Angana Ghosh, Sunnyvale, CA (US); Stephen David Zelinka, Los Gatos, CA (US); Mohammed Waleed Kadous, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/861,152

(22) Filed: Apr. 11, 2013

Related U.S. Application Data (60) Provisional application No. 61/719,139, filed on Oct. 26, 2012, provisional application No. 61/714,226, filed on Oct. 16, 2012.

(51) Int. Cl.
*H04L 29/06* (2006.01)

(52) U.S. Cl.
USPC ........................................ 713/166; 455/456.1

(58) Field of Classification Search
None
See application file for complete search history.

(56) References Cited

U.S. PATENT DOCUMENTS

| | | |
|---|---|---|
| 7,079,950 B2 | 7/2006 | Sakata |
| 8,126,889 B2 | 2/2012 | Pitt |
| 2010/0077484 A1 | 3/2010 | Paretti |

*Primary Examiner* — Fikremariam A Yalew
(74) *Attorney, Agent, or Firm* — Troutman Sanders LLP; James E. Schutz; Scott D. Barnett (57) ABSTRACT

Certain embodiments of this disclosure include methods and devices for adjusting the precision of location information. According to one embodiment, a method is provided. The method may include: obtaining a request for location information from an application; determining that the location information needs to be adjusted; obtaining the location information; adjusting the location information, wherein the adjusting includes: (i) adding noise to the location information to obtain noisy location information, (ii) discretizing the noisy location information to obtain discretized location information, and (iii) hysteresizing the discretized location information to obtain adjusted location information. The adjusted location information may then be provided to the requesting application.

20 Claims, 3 Drawing Sheets

METHODS AND DEVICES FOR ADJUSTING THE PRECISION OF LOCATION INFORMATION

CROSS-REFERENCE TO RELATED APPLICATIONS

This application claims the benefit of U.S. Provisional Patent Application No. 61/719,139 filed Oct. 26, 2012 entitled "Methods and Devices for Adjusting the Precision of Location Information" and U.S. Provisional Patent Application No. 61/714,226 filed Oct. 16, 2012, entitled "Methods and Devices for Adjusting the Precision of Location Information," both of which are hereby incorporated by reference in their entirety.

BACKGROUND

Many applications (i.e., computer programs) executing on a computing device make use of geographic location information describing the physical, real-world location of the computing device. Applications use this geographic location information (hereinafter referred to simply as "location information") for a variety of reasons. By way of example, an application designed to report the weather may make use of location information to provide a local weather report on the device (i.e., a report on the weather in the vicinity of the computing device on which the weather application is executing). Similarly, an application designed to assist with navigation may use location information to ascertain a current position of the computing device in relation to a destination, so as to provide directions in substantially real-time. While there are many benefits to supplying applications with location information (e.g., improved and expanded functionalities of those applications), applications' use of location information also raises privacy concerns. For example, users may be concerned that certain applications are using the location information in undesirable ways (e.g., supplying the location information to specific marketers based upon knowledge of a user's whereabouts ascertained through the location information). Accordingly, technologies have been developed to control the precision of the location information that is provided to different applications.

Conventionally, the precision of the location information that was provided to different applications executing on a computing device was controlled through two primary techniques. In a system employing the first technique, applications were configured to request a particular precision of location information through the use of permission levels. That is to say, different granularities of location information were defined as corresponding to different permission levels. An application desirous of obtaining location information having a particular precision (i.e., accuracy) would simply request the location information by supplying an appropriate permission level. In this manner, applications could obtain location information at any level of granularity desired by simply requesting that location information with the proper permission level. However, this technique relied upon the applications themselves to dictate the precision of the location information to be provided, which creates privacy concerns when it is not entirely known how that location information will be used by the applications.

In a system employing the second technique, applications were associated with particular sensors. In this manner, the precision of the location information that was supplied to the different applications was dependent upon the precision of the sensors associated with those different applications. For example, a first application could be associated with one or more sensors employing cellular triangulation technology as a means for obtaining the location information. Accordingly, the precision of the location information supplied to this application would be limited to the maximum precision obtainable through cellular triangulation techniques. Conversely, a second application could be associated with one or more sensors employing wireless local area network (Wi-Fi) technology. Sensors employing Wi-Fi technology are capable of obtaining far more precise location information than sensors employing cellular triangulation technology. Accordingly, this second application would be capable of obtaining far more precise location information than the first application. However, systems employing this technique are incapable of leveraging current technology that allows for a highly precise measurement of location by analyzing the input from several different types of sensors (e.g., GPS sensors, Wi-Fi sensors, cellular sensors, etc.).

Another shortcoming of conventional location information adjustment systems is that they employ unsophisticated techniques for adjusting the precision of the location information. As such, the adjusted location information generated by these systems may be easily reverse-engineered. That is to say, conventional systems employing simple techniques for adjusting the precision of location information are susceptible to reverse-engineering, whereby the highly precise form of the location information may be surmised based on the adjusted location information.

Accordingly, there is a need for a new technology aimed at addressing one or more of the drawbacks associated with conventional techniques for controlling the precision of location information being provided to particular applications.

SUMMARY

The instant disclosure describes methods and devices for adjusting the precision of location information that is supplied to applications. To this end, in one example, a method is provided. The method includes obtaining a request for location information from an application. A determination may be made that the location information needs to be adjusted. The method may further include obtaining the location information. The obtained location information may be adjusted by: (i) adding noise to the location information to obtain noisy location information; (ii) discretizing the noisy location information to obtain discretized location information; and (iii) hysteresizing the discretized location information to obtain adjusted location information. The adjusted location information may further be provided to the application.

In one example, the method additionally includes obtaining application clearance level information. The application clearance level information includes information describing a maximum precision level of the location information that may be provided to a given application. In this example, the adjustment of the location information may additionally be based on the application clearance level information.

In one example, adding noise to the location information includes applying an algorithm to the location information, wherein the algorithm is configured to add a random distribution to the location information. In another example, discretizing the noisy location information includes rounding the noisy location information (i.e., a numeric representation of the noisy location information) to a predefined number of significant figures. In still another example, hysteresizing the discretized location information includes determining whether the discretized location information has remained consistent over a period of time.

In one example, obtaining the location information includes integrating sensor-based location information from a plurality of sensors. In still another example, the method additionally includes providing the adjusted location information to one or more applications other than the application that requested the location information.

According to another embodiment, a computing device is provided. The computing device includes, at least, a location determining module and a precision adjustment module. The location determining module is configured to determine location information describing the geographic location of the computing device. The precision adjustment module is operatively connected to the location determining module and is configured to adjust the location information by (i) adding noise to the location information to obtain noisy location information; (ii) discretizing the noisy location information to obtain discretized location information; and (iii) hysteresizing the discretized location information to obtain adjusted location information. In one example, the precision adjustment module is configured to adjust the location information based on application clearance level information.

In another example embodiment, a computer program product embodied in a non-transitory computer-readable medium having an algorithm adapted to effectuate a method is provided. According to the method, location information may be obtained. The location information may be adjusted by (i) adding noise to the location information to obtain noisy location information; (ii) discretizing the noisy location information to obtain discretized location information; and (iii) hysteresizing the discretized location information to obtain adjusted location information.

These and other objects, features, and advantages of the foregoing method, computing device, and computer program product will become more apparent upon reading the following specification in conjunction with the accompanying drawing figures.

BRIEF DESCRIPTION OF THE FIGURES

Reference will now be made to the accompanying figures and flow diagrams, which are not necessarily drawn to scale, and wherein.

DETAILED DESCRIPTION

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

Providing highly precise location information to requesting applications can raise privacy concerns. Conventional technology did little to alleviate these privacy concerns due to the drawbacks discussed above. Accordingly, the instant disclosure provides methods and devices for controlling the precision of location information that is provided to requesting applications in a manner that overcomes many of the shortcomings of existing technology, including mitigating the privacy concerns.

Various embodiments of the disclosed technology provide methods, devices, and computer program products for adjusting the precision of location information. In one example embodiment, a method for adjusting the precision of location information is provided. The method may include obtaining location information; and adjusting the location information by (i) adding noise to the location information to obtain noisy location information; (ii) discretizing the noisy location information to obtain discretized location information; and (iii) hysteresizing the discretized location information to obtain adjusted location information.

In another example embodiment, a computer program product embodied in a non-transitory computer-readable medium comprising an algorithm adapted to effectuate a method is provided. The method may include obtaining location information and adjusting the location information by (i) adding noise to the location information to obtain noisy location information; (ii) discretizing the noisy location information to obtain discretized location information; and (iii) hysteresizing the discretized location information to obtain adjusted location information.

Figure 1:
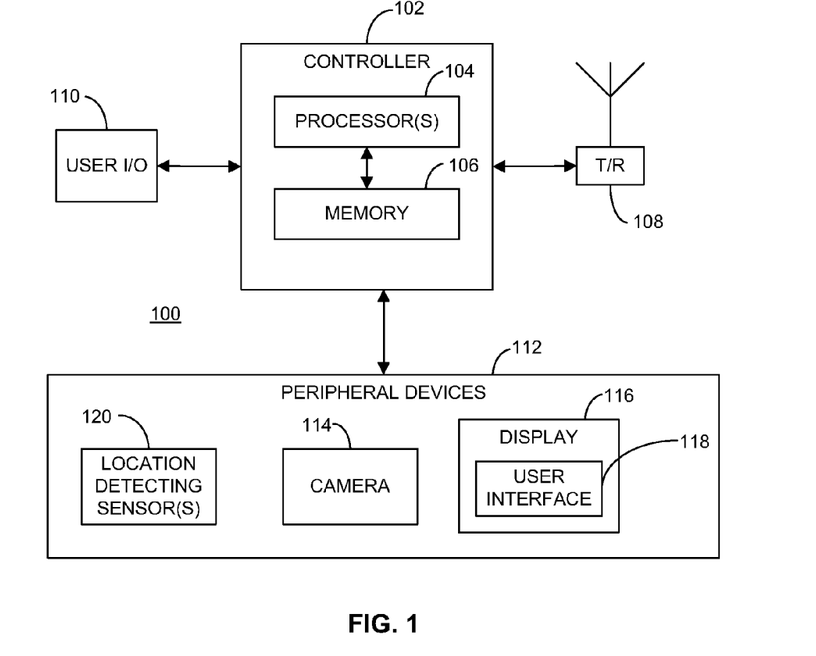
FIG. 1 is a block diagram illustrating one example of a computing device suitable for use in adjusting the precision of location information in accordance with the disclosed technology.

Referring now to the Figures, in which like reference numerals represent like parts, various embodiments of the computing devices and methods will be disclosed in detail. FIG. 1 is a block diagram illustrating one example of a computing device 100 suitable for use in adjusting the precision of location information supplied to applications running on the computing device 100. The computing device 100 may be, for example, a cellular phone, a "smart" phone, a personal digital assistant (PDA), a tablet, a laptop or desktop computer, or any other suitable communication device capable of performing the processing described herein.

In the illustrated example, the computing device 100 includes a controller 102, a transceiver 108, a user input/output interface 110, and peripheral devices 112. The controller 102 includes one or more processors 104 and memory 106. In an embodiment, the one or more processors 102 may include one or more devices such as microprocessors, microcontrollers, digital signal processors, or combinations thereof, capable of executing stored instructions and operating upon stored data that is stored in, for example, the memory 106. The memory 106 may include one or more devices such as volatile or nonvolatile memory including, but not limited to, random access memory (RAM) or read only memory (ROM). Further still, the memory 106 may be embodied in a variety of forms, such as a solid state drive, hard drive, optical disk drive, floppy disk drive, etc. Processor and memory arrangements of the types illustrated in FIG. 1 are well known to those having ordinary skill in the art. In one embodiment, the processing techniques described herein are implemented as a combination of executable instructions and data within the memory 106 used to control operation of, and operated upon by, the one or more processors 104.

The user input/output 110 may include any suitable components for receiving input from, and/or communicating output to, a user. For example, the user input components could include a keypad, a touch screen, a mouse, a microphone and suitable voice recognition application, etc. The user output components may include, for example, speaker(s), light(s) (e.g., one or more LED lights), buzzer(s) (e.g., one or more components capable of vibrating to alert the user, for example, of an incoming text message), etc. Other suitable input/output components will be discussed below with regard to peripheral devices 112. The transceiver 108 may comprise one or more suitable transceivers capable of transmitting and receiving information as known in the art. For example, the transceiver 108 may transmit and receive information using wireless communication resources implementing any of a variety of communication protocols, such as TDM (time-division-multiplexed) slots, carrier frequencies, a pair of carrier frequencies, or any other radio frequency (RF) transmission media. Further still, although the transceiver 108 is illustrated in FIG. 1 as being wireless, those having ordinary skill in the art will appreciate that the transceiver 108 may be additionally/alternatively capable of supporting communication using wired communication resources.

The peripheral devices 112 are any devices that are typically external to the computing device 100 that may nevertheless interact with the computing device 100, non-limiting examples of which include a camera 114, a display 116, and one or more location detecting sensors 120. While the peripheral devices 112 are typically external to the electronic device 100, they may instead be incorporated into the electronic device 100 as part of, for example, the user input/output 110. The camera 114 may be any suitable camera capable of capturing still image and/or video data using techniques known in the art. In one example, the camera 114 may include a digital camera configured to capture an image and/or video. The captured image/video may be stored locally, for example, in memory 106. The display 116 may include any conventional integrated or external display mechanism such as a touch screen, a LED display, a cathode ray tube (CRT) display, a plasma display, a LCD display, or any other display mechanism known to those having ordinary skill in the art. In an embodiment, the display 116, in conjunction with suitable stored instructions (e.g., suitable stored instructions stored in memory 106), may be used to implement a graphical user interface (GUI), such as graphical user interface 118. Implementation of a graphical user interface in this manner is well known to those having ordinary skill in the art.

The location detecting sensor(s) 120 include sensors enabled to detect and/or obtain the location of the computing device 100. For example, in one embodiment, the location detecting sensor(s) 120 are configured to detect and/or obtain location information 206 using well known techniques such as GPS (Global Positioning Systems) technology, wireless local area network (Wi-Fi) technology, wide area network technology, Bluetooth technology, cellular triangulation technology, etc. In still other embodiments, location detecting sensor(s) 120 may include sensors adapted to ascertain the geographic location of the computing device 100 using accelerometer technology, gyroscopic technology, magnetic-based compass technology, or other suitable technologies for detecting the location of the computing device 100 known to those having skill in the art.

Figure 2:
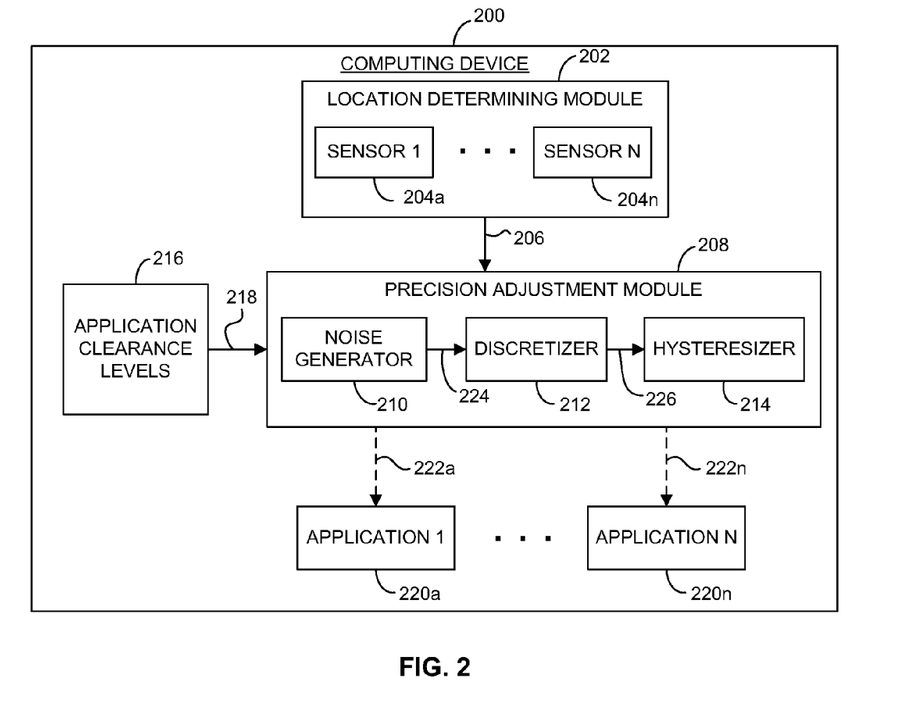
FIG. 2 is a block diagram illustrating another example of a computing device suitable for use in adjusting the precision of location information in accordance with the disclosed technology.

FIG. 2 is a block diagram illustrating another example of a computing device 200 for implementing the teachings of the disclosed technology. While the computing device 200 is discussed generically as to its functionality, it is noted that the computing device 200 may be implemented physically as the computing device 100 previously discussed. The computing device 200 includes a location determining module 202, a precision adjustment module 208, one or more application clearance levels 216 (i.e., non-transitory data stored in memory, such as memory 106 described above), and one or more applications 220a-220n executing on the computing device 200. In one example, components 202 and 208 may be implemented as software modules that may be executed, for example, by one or more processors, such as the one or more processors 104 discussed above with regard to FIG. 1. However, those having ordinary skill in the art will recognize that the components 202 and 208 may equally be implemented using firmware and/or hardware devices such as application specific integrated circuits (ASICs), programmable logic arrays, state machines, etc.

In operation, an application (e.g., application 1 220a, application N 220n, etc.) may request location information 206 using techniques known in the art. Upon obtaining the request for location information 206, a determination may be made that the location information 206 needs to be adjusted before it is provided to the requesting application. In one example, the determination that the location information 206 needs to be adjusted may be based on the application clearance levels 216 described in further detail below. Nonetheless, the location determining module 202 is configured to obtain the location information 206 describing the geographic location of the computing device 200. In one example, the location determining module 202 includes one or more sensors 204a-204n configured to detect and/or obtain the location information 206. The sensors 204a-204n may detect and/or obtain the location information 206 using one or more of the location detecting technologies described above with regard to location detecting sensor(s) 120. As used herein, obtaining the location information may include obtaining the location information 206 directly from a single, particular sensor (e.g., sensor 1 204a) or obtaining the location information 206 from a plurality of sensors. For example, in one embodiment, the location determining component 202 is configured to obtain the location information 206 based upon a combination of different types of location information provided by different sensors (e.g., sensors 204a-204n). For instance, a combination of GPS-based location information and Wi-Fi-based location information may yield location information 206 that is more precise than the location information provided by either a GPS sensor or Wi-Fi sensor individually. Accordingly, in this example, the location determining module 202 is configured to integrate (i.e., "fuse" or "meld") the discrete types of location information provided by the different sensors in order to obtain highly precise location information 206. Techniques for combining different types of discrete location information into a single, highly-precise form of location information 206 are well known to those having ordinary skill in the art.

Computing device 200 also includes a precision adjustment module 208 operatively connected to the location determining module 202. The precision adjustment module 208 is configured to receive the location information 206 from the location determining module 202 and perform further processing. The precision adjustment module 208 includes a noise generator 210, a discretizer 212, and a hysteresizer 214. The noise generator 210, discretizer 212, and hysteresizer 214 may be implemented as software modules that may be executed, for example, by one or more processors, such as the one or more processors 104 discussed above with regard to FIG. 1. However, those having ordinary skill in the art will recognize that the components 210, 212, and 214 may equally be implemented using firmware and/or hardware devices such as application specific integrated circuits (ASICs), programmable logic arrays, state machines, etc.

The noise generator 210 of the precision adjustment module 208 is configured to add noise to the location information 206 to obtain noisy location information 224. By way of example and not limitation, the noise generator 210 may add noise to the location information 206 by applying an algorithm that adds a random distribution to the underlying location measurement provided as part of the location information 206. A number of random distributions may be suitably employed for this purpose including, but not limited to, Gaussian, Poisson, etc. By way of example and not limitation, the location information 206 supplied as input to the noise generator 210 may take the form of latitudinal/longitudinal coordinates, such as (37.420287, −122.08395). In this example, the noise generator 210 may add Gaussian noise (although any random distribution function known in the art may be suitably employed for this purpose) with a standard deviation of five-hundred meters (500 m). Accordingly, the noisy location information 224 output by the noise generator 210 may now take the form of different (noisy) latitudinal/longitudinal coordinates, such as (37.423512, −122.08114). As such, the highly precise location information 206 supplied to the noise generator may be adjusted and concealed from applications, such as applications 220a-220n.

Further still, in one example embodiment, the noise generator 210 is operative to change (i.e., alter) the value of the noise that is added to the location information 206 over time. For example, in this embodiment, the noise generator 210 may alter the location information 206 by adding a combination of "old noise" (i.e., a noise value that was applied to the location information 206 at a first point in time) and "new noise" (i.e., a new noise value that is different from the noise value that was applied to the location information at the first point in time).

By way of example and not limitation, during a first processing cycle, the noise generator 210 may add Gaussian noise with a standard deviation of five-hundred meters (500 m) to the location information 206 to obtain noisy location information 224. Subsequently, during a second processing cycle, the noise generator 210 may add noise to the location information 206 by applying a combination of the old noise value (i.e., adding Gaussian noise with the standard deviation of five-hundred meters) and a new noise value (e.g., adding Poisson noise with a standard deviation of four-hundred meters). Further still, in one example, the "old noise value" and the "new noise value" may be weighted. Again, by way of example and not limitation, the "old noise value" may account for 97% of the total noise added to the location information 206 during the second processing cycle, while the "new noise value" may account for 3% of the noise added to the location information 206 during the second processing cycle. Of course, the particular weights to be applied to the "old noise value" and the "new noise value" are merely exemplary in nature and any suitable weighting scheme may be applied as desired. In this manner, the "true," or highly precise, location information 206 may be further concealed from applications, such as applications 220a-220n. Applying noise to the input location information 206 in this fashion also makes it tremendously difficult for an application (or programmer) to "reverse engineer" the adjusted location information 222a-222n provided to the application(s), so as to ascertain a highly precise measurement of the true location of the computing device 200.

The discretizer 212 of the precision adjustment module 208 is configured to reduce the precision (i.e., accuracy) of the noisy location information 224 further. For example, in one embodiment, the discretizer 212 is configured to round the measurement of the computing device's location to a desired number of significant figures. By way of example and not limitation, if the noisy location information 224 indicates that the location of the computing device 200 is (37.423512, −122.08114) in latitudinal/longitudinal coordinates, the discretizer 212 may round this measurement to (37.42, −122.08). While the preceding example involved rounding the latitudinal/longitudinal coordinates from eight significant figures to four significant figures, those having skill in the art will recognize that the discretizer 212 may be configured to round the noisy location information 224 to any suitable number of significant figures as desired. In this manner, the discretizer 212 is operative to obtain discretized location information 226.

The hysteresizer 214 of the precision adjustment module 208 is configured to further affect the precision of the discretized location information 226. Hysteresis refers to the dependence of a system not only on its current environment, but also on its past environment. This dependence arises because the system can be in more than one internal state. The hysteresizer 214 of the precision adjustment module 208 is configured to analyze the discretized location information 226 at one or more different points in time in order to determine when to provide adjusted location information 222a, 222n based on design constraints. For example, the hysteresizer 214 may be programmed only to provide new location information (i.e., adjusted location information 222a, 222n differing from adjusted location information 222a, 222n previously provided to applications 220a, 220n) if the discretized location information 226 provided to the hysteresizer 214 has remained consistent (i.e., has been the same measurement) for a predetermined period of time and/or number of polls.

That is to say, in one embodiment, the hysteresizer 214 may be programmed to periodically poll/sample the value of the discretized location information 226 it receives. If the value of the discretized location information 226 remains consistent over a predefined amount of time and/or number of polls, the hysteresizer 214 may obtain the "new" adjusted location information 222a, 222n, which may be provided to one or more of the applications 220a, 220n. Otherwise (i.e., if the value of the discretized location information 226 is constantly changing), the hysteresizer 214 may continue to provide previously reported adjusted location information 222a, 222n, or no location information at all. In this manner, an application (e.g., applications 220a, 220n) may not "reverse engineer" the location of the computing device by recognizing consistent changes in the reported location information over a period of time so as to "hone in" on the true, precise location of the computing device.

In one exemplary embodiment, the precision adjustment module 208 is further configured to obtain one or more application clearance levels 218. Application clearance levels 218 may include data describing the specific precision that each of the one or more applications requesting location information need in order to function properly. For example, a weather reporting application may only require (City, State)-level location information in order to accurately report the weather in the proximity of the computing device 200. However, a navigation application may require more precise location information, such as latitudinal/longitudinal coordinates to provide real-time directions. In this example, it could be expected that the weather application would have a different clearance level than the navigation application. The application clearance level information 218 may be used by the precision adjustment module 208 to determine how much (i.e., to what extent) to adjust the location information 206 before providing the adjusted location information 222a, 222n to the applications 220a, 220n. For example, the application clearance level information 218 may indicate that an application requesting location information is only entitled to location information on the granularity of (City, State). Accordingly, the precision adjustment module 208 may tune each of the noise generator 210, discretizer 212, and hysteresizer 214 such that the adjusted location information provided to the requesting application only provides the City and State that the computing device currently resides in.

Figure 3:
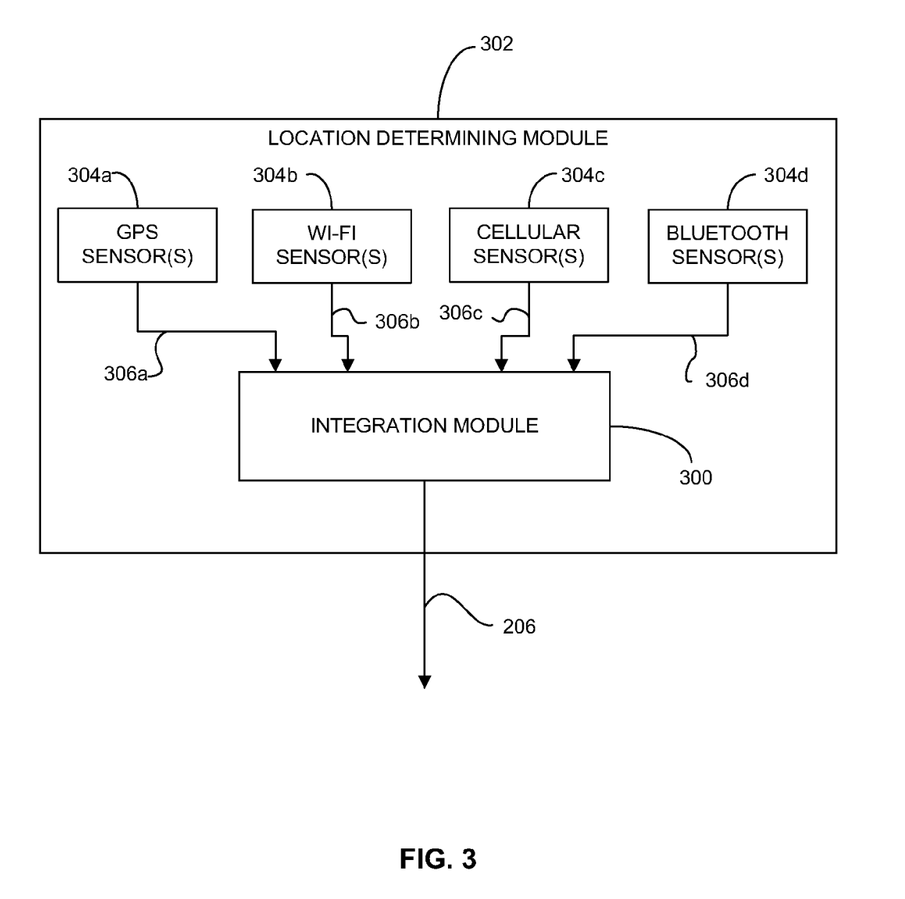
FIG. 3 is a block diagram illustrating one example of a location determining module suitable for use in integrating location information obtained from one or more sensors in accordance with the disclosed technology.
Figure 4:
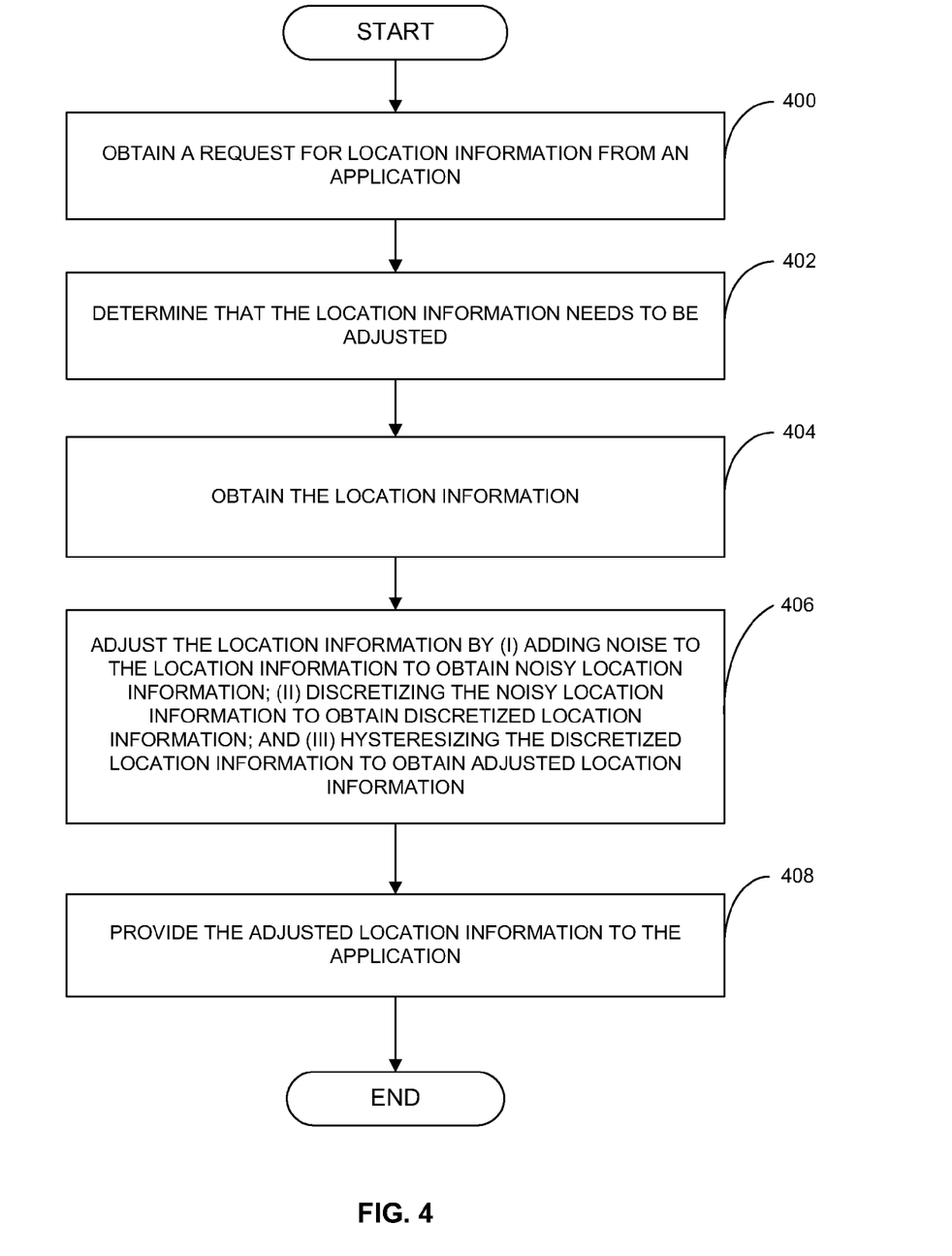
FIG. 4 is a flow diagram illustrating a method for adjusting the precision of location information according to one embodiment of the disclosed technology.

FIG. 3 is a block diagram illustrating one example of a location determining module 302 similar to the location determining module 202 described above. However, as illustrated in FIG. 4, the location determining module 302 includes an integration module 300. The integration module 300 may be implemented as one or more software modules that may be executed, for example, by one or more processors, such as the one or more processors 104 discussed above with regard to FIG. 1. However, those having ordinary skill in the art will recognize that integration module 300 may equally be implemented using firmware and/or hardware devices such as application specific integrated circuits (ASICs), programmable logic arrays, state machines, etc.

Regardless of the manner in which it is implemented, the integration module 300 is configured to obtain sensor-based location information 306a-306d from one or more sensors, such as sensors 304a-304d. Although FIG. 4 only depicts four varieties of sensors (i.e., GPS sensor(s), Wi-Fi sensor(s), cellular sensor(s), and Bluetooth sensor(s)), those having skill in the art will appreciate that any suitable alternative, or additional, sensors may also be employed. For example, one or more accelerometers and/or gyroscopes may also be employed in order to provide sensor-based location information. In operation, the integration module 300 is configured to obtain the sensor-based location information 306a-306d and integrate the disparate types of sensor-based location information 306a-306d into a single representation of location information 206. In one example, the integration module 300 may simply select the sensor-based location information deemed to be most precise and pass that on as the location information 206. For example, if Wi-Fi sensor-based location information 306a was determined by the integration unit to provide the most precise measurement of the computing device's location, then in this example, the Wi-Fi sensor-based location information 306a would be passed on by the integration module 300 as the location information.

However, in another exemplary embodiment, the integration unit 300 is configured to "fuse" the disparate types of sensor-based location information 306a-306d into a single representation of the computing device's location that is more precise than any of the discrete types of sensor-based location information 306a-306d individually. For example, in this embodiment, the integration unit 300 may be configured to apply a Kalman Filter (i.e., a linear quadratic estimation (LQE) algorithm) and/or a Particle Filter (i.e., a sequential Monte Carlo method algorithm) to the disparate types of sensor-based location information 306a-306d in order to arrive at a highly precise location information 206 that is more precise than any of the discrete types of sensor-based location information 306a-306d individually. While the previous example discussed use of a Kalman and/or Particle Filter, those having ordinary skill in the art will recognize that other suitable methods for estimating an unknown variable (i.e., the location information 206) from a set of measurements (e.g., the sensor-based location information 306a-306d) may be equally employed as desired.

Further still, while the preceding discussion of the integration unit 300 focused on obtaining sensor-based location information 306a-306d at a single point in time, those having ordinary skill will appreciate that the same integration and fusing techniques may be equally applied to the sensor-based location information 306a-306d over a period of time (e.g., over five separate measurements of each of the sensor-based location information 306a-306d) to further increase the precision of the location information 206.

Referring now to FIG. 4, a flow diagram illustrating a method for adjusting the precision of location information supplied to one or more applications is provided. While the computing devices 100, 200 are two forms for implementing the processing described herein (including that illustrated in FIG. 4), those having ordinary skill in the art will appreciate that other, functionally equivalent techniques may be employed. Furthermore, as known in the art, some or all of the functionalities implemented via executable instructions may also be implemented using firmware and/or hardware devices such as supplication specific circuits (ASICs), programmable logic arrays, state machines, etc. Once again, those of ordinary skill in the art will appreciate the wide number of variations that may be used in this manner.

Beginning at step 400, a request for location information is received from an application. At step 402, a determination is made that the location information needs to be adjusted. At step 404, the location information is obtained. At step 406, the location information is adjusted by (i) adding noise to the location information to obtain noisy location information; (ii) discretizing the noisy location information to obtain discretized location information; and (iii) hysteresizing the discretized location information to obtain adjusted location information. Finally, at step 408, the adjusted location information is provided to the application.

Certain embodiments of this technology are described above with reference to block and flow diagrams of computing devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any devices or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Furthermore, in situations in which the methods and devices discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how much information is collected about the user and used by a content server.

What is claimed is:

1. A computer-implemented method comprising:
    obtaining, by a processing device, a request for location information from an application;
    determining, by the processing device, that the location information needs to be adjusted;
    obtaining, by the processing device, the location information; and
    adjusting, by the processing device, the location information, wherein the adjusting comprises:
        adding noise to the location information to obtain noisy location information;
        discretizing the noisy location information to obtain discretized location information; and
        hysteresizing the discretized location information to obtain adjusted location information; and
    providing, by the processing device, the adjusted location information to the application.

2. The computer-implemented method of claim 1, further comprising:
    obtaining application clearance level information; and
    wherein adjusting the location information further comprises adjusting the location information based on the application clearance level information.

3. The computer-implemented method of claim 2, wherein the application clearance level information comprises information describing a maximum precision level of the location information that may be provided to respective one or more applications.

4. The computer-implemented method of claim 1, wherein adding noise to the location information comprises applying an algorithm to the location information, wherein the algorithm is configured to add a random distribution to the location information.

5. The computer-implemented method of claim 1, wherein adding noise to the location information comprises:
    adding a first noise value to the location information, wherein the first noise value is associated with a first weight; and
    adding a second noise value to the location information that is different than the first noise value, wherein the second noise value is associated with a second weight that is different than the first weight.

6. The computer-implemented method of claim 1, wherein discretizing the noisy location information comprises rounding the noisy location information to a predefined number of significant figures.

7. The computer-implemented method of claim 1, wherein hysteresizing the discretized location information comprises determining whether the discretized location information has remained consistent over a period of time.

8. The computer-implemented method of claim 1, wherein obtaining the location information comprises integrating sensor-based location information from a plurality of sensors.

9. The computer-implemented method of claim 1, further comprising:
    providing the adjusted location information to one or more applications other than the application that requested the location information.

10. A computing device comprising:
    a location determining module configured to obtain location information;
    a precision adjustment module operatively connected to the location determining module, wherein the precision adjustment module is configured to adjust the location information by:
        adding noise to the location information to provide noisy location information;
        discretizing the noisy location information to provide discretized location information; and
        hysteresizing the discretized location information to provide adjusted location information.

11. The computing device of claim 10, wherein the precision adjustment module is further configured to:
   obtain application clearance level information; and
   adjust the location information based on the application clearance level information.

12. The computing device of claim 11, wherein the application clearance level information comprises information describing a maximum precision level of the location information that may be provided to respective one or more applications.

13. The computing device of claim 10, wherein the precision adjustment module is configured to add noise to the location information by applying an algorithm to the location information, wherein the algorithm is configured to add a random distribution to the location information.

14. The computing device of claim 10, wherein the precision adjustment module is configured to add noise to the location information by:
   adding a first noise value to the location information, wherein the first noise value is associated with a first weight; and
   adding a second noise value to the location information that is different than the first noise value, wherein the second noise value is associated with a second weight that is different than the first weight.

15. The computing device of claim 10, wherein the precision adjustment module is configured to discretize the noisy location information by rounding the noisy location information to a predefined number of significant figures.

16. The computing device of claim 10, wherein the precision adjustment module is configured to hysteresize the discretized location information by determining whether the discretized location information has remained consistent over a period of time.

17. The computing device of claim 10, wherein the location determining module comprises a plurality of sensors, and wherein the location determining module is configured to obtain the location information by integrating sensor-based location information from the plurality of sensors.

18. A computer program product embodied in a non-transitory computer-readable medium, the computer program product comprising an algorithm adapted to effectuate a method comprising:
   obtaining location information; and
   adjusting the location information by:
      adding noise to the location information to provide noisy location information;
      discretizing the noisy location information to provide discretized location information; and
      hysteresizing the discretized location information to provide adjusted location information.

19. The computer program product of claim 18, wherein the algorithm is adapted to effectuate the method further comprising:
   obtaining application clearance level information; and
   wherein adjusting the location information further comprises adjusting the location information based on the application clearance level information.

20. The computer program product of claim 19, wherein the application clearance level information comprises information describing a maximum precision level of the location information that may be provided to respective one or more applications.

* * * * *